United States Patent
Ellis et al.

(10) Patent No.: US 7,925,671 B2
(45) Date of Patent: Apr. 12, 2011

(54) METHOD AND SYSTEM FOR AUTOMATIC CUE SHEET GENERATION

(75) Inventors: Steven Ellis, Germantown, NY (US); Steven Askew, Germantown, NY (US)

(73) Assignee: Getty Image (US), Inc., New York, NY (US)

( * ) Notice: Subject to any disclaimer, the term of this patent is extended or adjusted under 35 U.S.C. 154(b) by 151 days.

(21) Appl. No.: 11/133,903

(22) Filed: May 19, 2005

(65) Prior Publication Data

US 2006/0044957 A1  Mar. 2, 2006

Related U.S. Application Data

(60) Provisional application No. 60/600,661, filed on Aug. 11, 2004.

(51) Int. Cl.
  *G06F 17/30* (2006.01)
(52) U.S. Cl. ........ 707/796; 707/661; 707/689; 707/690; 707/722; 707/736; 707/758; 707/781; 707/791; 707/793; 707/797; 707/798; 707/802; 707/828; 705/26; 705/27; 705/40; 725/37; 348/143; 348/153; 348/156; 348/159; 386/46; 386/125
(58) Field of Classification Search .............. 705/40, 705/26, 27; 707/661, 689, 690, 722, 736, 707/758, 781, 791, 793, 797, 798, 802, 828, 707/999.101, 999.102, 999.103, 999.107; 725/37; 348/153, 156, 159; 386/46, 125
See application file for complete search history.

(56) References Cited

U.S. PATENT DOCUMENTS

| | | | | |
|---|---|---|---|---|
| 5,577,191 A | * | 11/1996 | Bonomi | 345/502 |
| 5,584,006 A | * | 12/1996 | Reber et al. | 711/100 |
| 5,760,767 A | | 6/1998 | Shore et al. | |
| 5,826,102 A | * | 10/1998 | Escobar et al. | 715/500.1 |
| 6,049,812 A | * | 4/2000 | Bertram et al. | 715/516 |
| 6,061,758 A | * | 5/2000 | Reber et al. | 711/100 |
| 6,111,562 A | * | 8/2000 | Downs et al. | 715/862 |
| 6,154,207 A | * | 11/2000 | Farris et al. | 715/500.1 |
| 7,209,892 B1 | * | 4/2007 | Galuten et al. | 705/26 |
| 2001/0028369 A1 | * | 10/2001 | Gallo et al. | 345/848 |
| 2001/0041050 A1 | | 11/2001 | Iwata et al. | |
| 2002/0165921 A1 | * | 11/2002 | Sapieyevski | 709/204 |

(Continued)

FOREIGN PATENT DOCUMENTS

WO  WO-01/75885 A2  10/2001

(Continued)

OTHER PUBLICATIONS

Supplementary International Search Report and Written Opinion, PCT Application No. EP05811978.5; Applicant: Getty Images, Inc.; Mailed: Oct. 12, 2010; 7 pages.

*Primary Examiner* — Syling Yen
(74) *Attorney, Agent, or Firm* — Perkins Coie LLP

(57) ABSTRACT

A cue sheet generation system is used to compose a cue sheet for submission to PRS from an input EDL. The system parses the EDL to extract data relating to use of musical works associated with a PRS. The system employs both local and remote databases to retrieve information relating to the extracted musical work data. The information is then used to construct a cue sheet in a form appropriate for submission to a PRS.

21 Claims, 4 Drawing Sheets

U.S. PATENT DOCUMENTS

| | | |
|---|---|---|
| 2003/0047602 A1 | 3/2003 | Iida et al. |
| 2003/0146915 A1* | 8/2003 | Brook et al. .................. 345/473 |
| 2005/0192934 A1* | 9/2005 | Ellis et al. ........................ 707/3 |
| 2005/0234818 A1* | 10/2005 | Marshall ........................ 705/40 |
| 2005/0276570 A1* | 12/2005 | Reed et al. ..................... 386/46 |
| 2006/0111988 A1* | 5/2006 | Rippingale .................... 705/26 |
| 2006/0259767 A1* | 11/2006 | Mansz et al. ................. 713/168 |

FOREIGN PATENT DOCUMENTS

WO    WO 2004046909 A1 *  6/2004

* cited by examiner

METHOD AND SYSTEM FOR AUTOMATIC CUE SHEET GENERATION

CROSS-REFERENCE TO RELATED APPLICATION

This application claims priority from U.S. patent application No. 60/600,661 entitled "Method and System for Automatic Cue Sheet Generation" filed Aug. 11, 2004, now pending, which is incorporated herein by reference.

BACKGROUND

Companies that use music in productions that are broadcast in any public way, such as television stations, radio stations or advertisers are required to pay royalties for such use. Agreements with performing rights societies ("PRS") which represent the music owners require these companies to create and file "cue sheets" in order to report the specific music they have used in each of their productions. Example PRS are ASCAP and BMI.

A "cue sheet" usually lists the name of the track used, how and where the track was used, the writer(s) of the track, the publisher of the track, and the performing rights society to which the track is affiliated. A cue sheet lists, in sequence, all music used in a particular production, duration of use, and form of use (i.e., whether it use as background instrumental music, as a theme, or as a featured performance). This information affects the royalty rate paid by the PRS to the owners of the music.

Ordinarily, an administrator at the broadcaster production facility compiles the cue sheet data from information indicating the music content used in a particular broadcast program. The administrator employs the musical content identification to retrieve data required for the cue sheet. The data is generally retrieved by reference to published indicis available either in print or online.

SUMMARY

The present invention provides an automated method for generating cue sheets from Edit Decision Lists (EDL) which are generated by production facilities. The present invention recognizes the EDL are generated by production facilities as part of an editing process when employing digital editing tools. The data in the EDL can be used to arrive at information which is required for a cue sheet submission. Accordingly, the present invention parses the EDL data to retrieve information for a cue sheet. The cue sheet information is then entered into corresponding fields of a cue sheet to provide a ready-for-submission cue sheet.

In one embodiment, the invention provides a method for generating a cue sheet for submission to a PRS. The method includes a computer receiving production piece information and an associated EDL file. The computer parses the EDL file to extract track file names, a duration of use, and a time code in the production piece for each file. The computer searches a database for the track file name to retrieve a composer, publisher, and PRS associated with the track file name. In a final step, the computer stores the extracted information and said retrieval information in a cue sheet template to provide a cue sheet for submission to a PRS.

DESCRIPTION

An edit decision list ("EDL") is a list of instructions for all the edit actions taken during the creation of a program. Some of the information provided by an EDL includes cuts, wipes, fades, dissolves, and black edits. The EDL organizes the instructions as a series of chronological edits called events. Each event specifies a timecode for the edit on the source and master. EDLs can display additional types of information such as comments and the different audio and video tracks in the sequence.

EDLs are created automatically by all forms of digital editing software (Avid, Final Cut Pro, Pro Tools). EDLs can be exported from the editing software as an EDL file or as a text file in a variety of formats. Each provides for different format data and possibly different presentation arrangement. The present application is adapted to operate with any EDL format as long as minimal music identification data is included.

The Cue Sheet Application automatically generates a cue sheet which contains all meta-data required by performing rights societies and is correctly formatted, by reference to the Edit Decision List created by any digital video/audio editing software.

Figure 1:
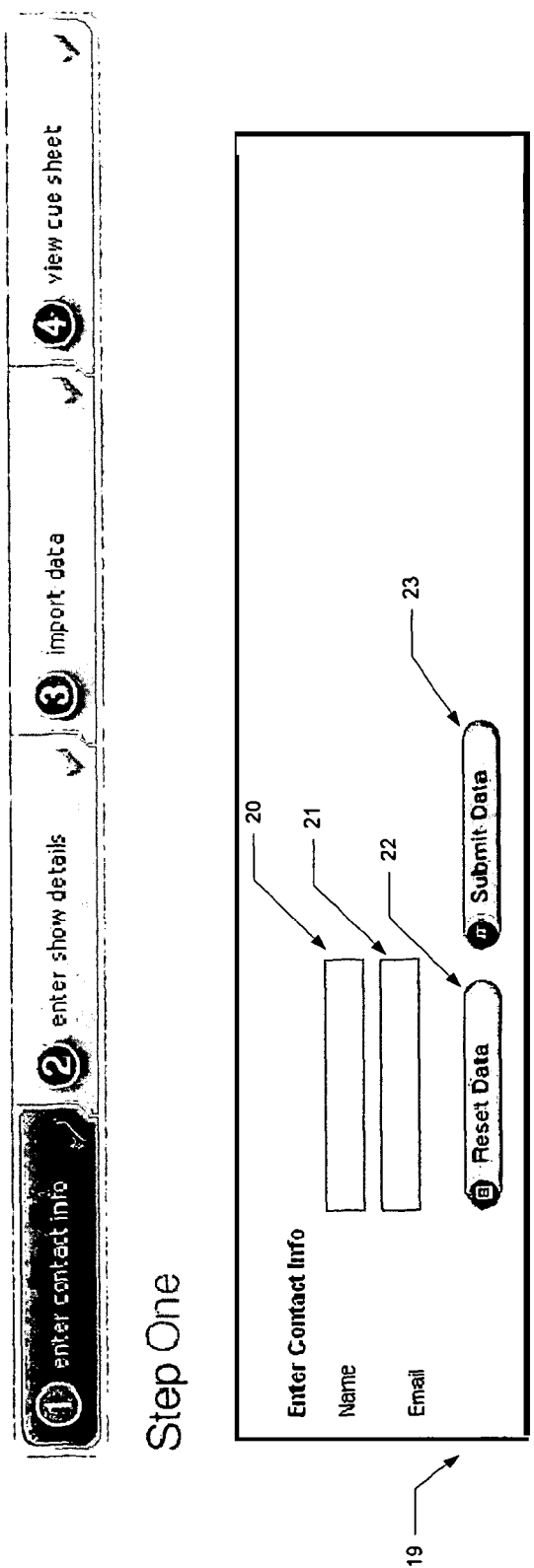
FIG. 1 illustrates a contact information screen of the web application of the invention.

The structure and operation of a system in accordance with the invention will now be discussed by reference to screen diagrams for a web based application that receives an EDL file and provides a corresponding output cue sheet. FIG. 1 illustrates a contact information screen 19 of the web application of the invention. The user preferably logs in to the web-application by entering a username and password. In the screen of FIG. 1, the user submits contact information by entering corresponding text in the name 20 and email 21 fields of the contact information screen 19.

Figure 2:
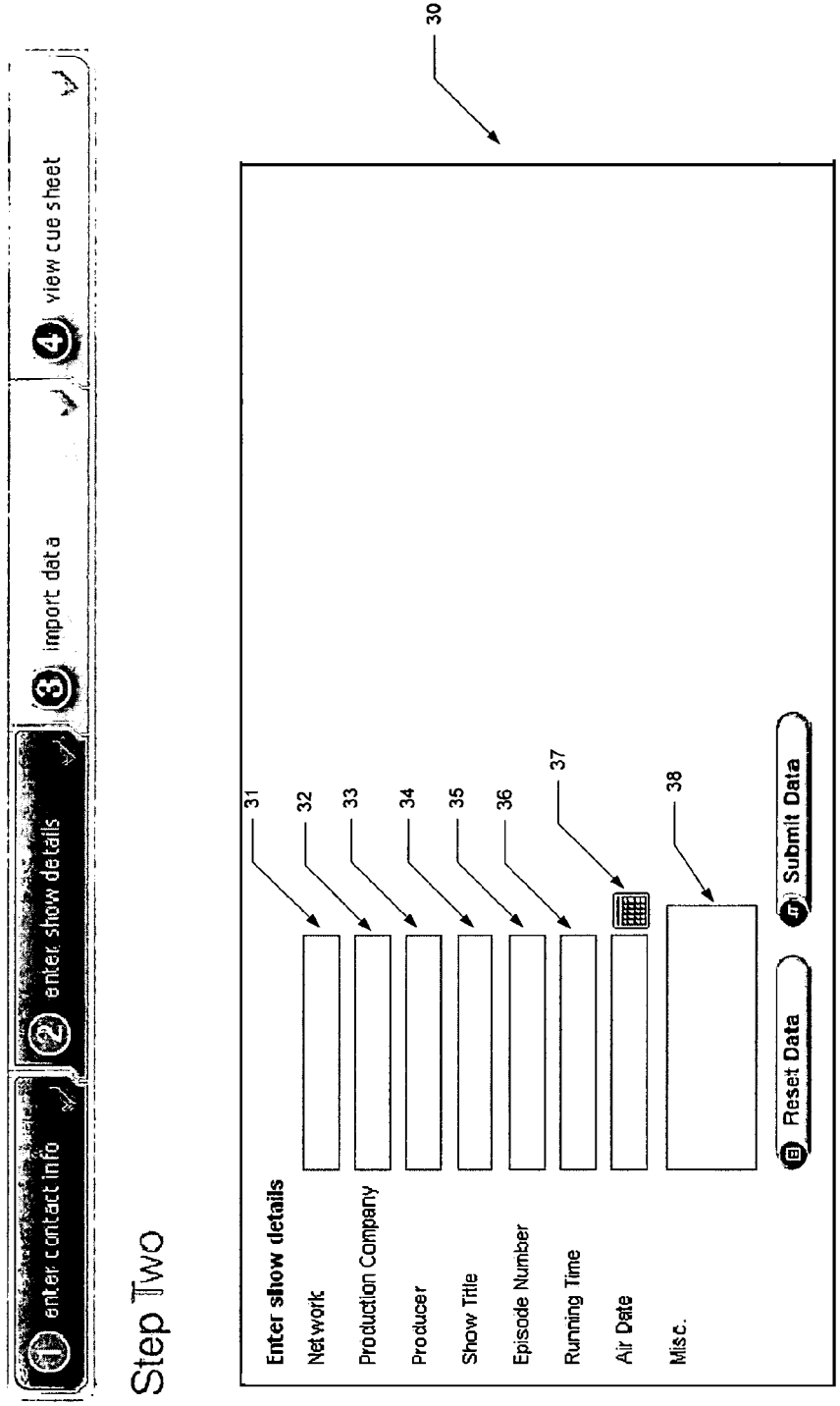
FIG. 2 illustrates a show details screen of the web application.

The form data is transmitted to the web server by selecting a Submit Data button 23. The form data is cleared by selecting a Reset Data button. FIG. 2 illustrates a show details screen 30 of the web application. The user enters data specific to the subject production in fields of the screen. These fields include: the network airing the show 31, the production company 32, the producer 33, name of the show 34 (including episode number 35), the length of the show 36, the airing date 37, and any miscellaneous comments 38. This information is generally required for a cue sheet since it identifies the manner and form of use. As discussed above, this information is critical to the PRS as it directly affects the royalty calculation.

Figure 3:
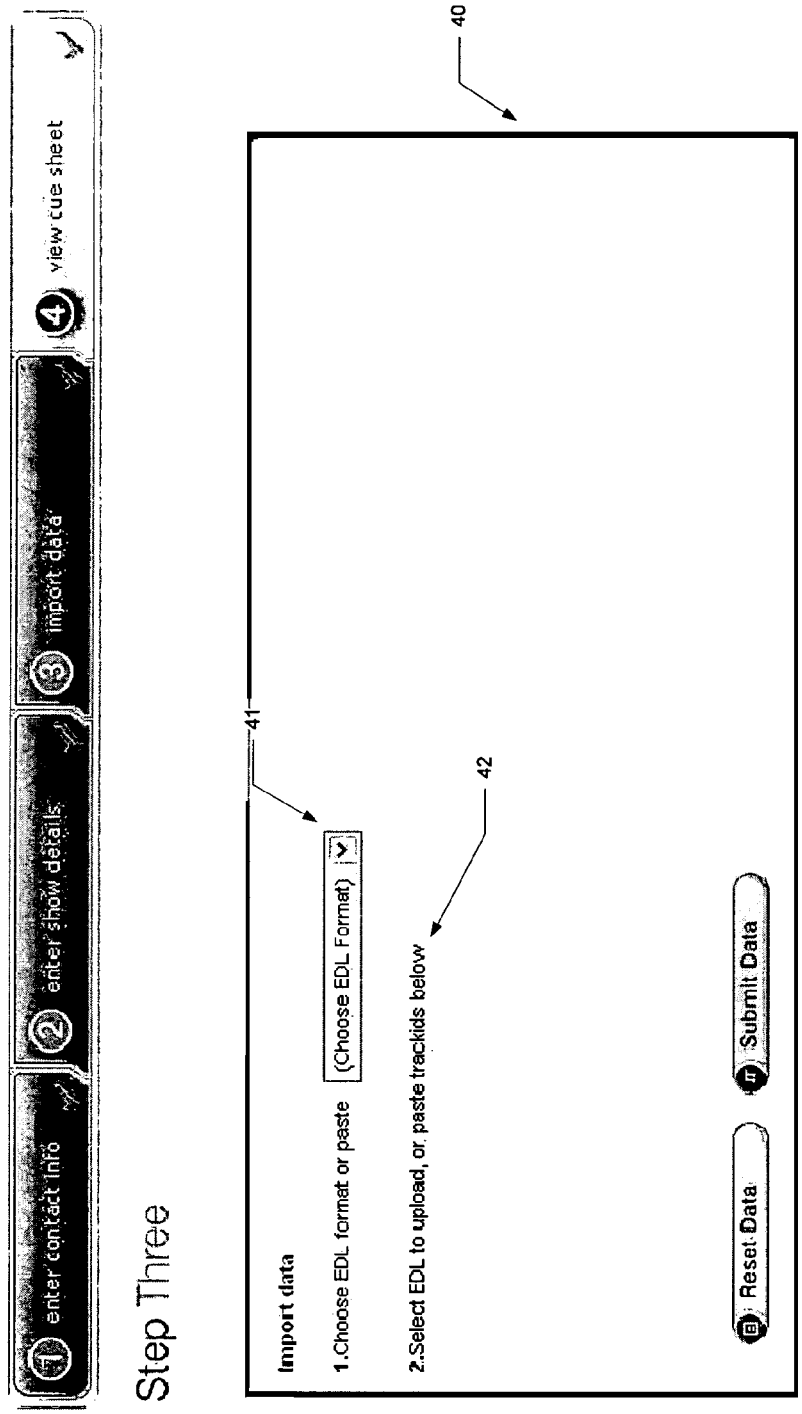
FIG. 3 illustrates a web application screen for importing EDL data.

FIG. 3 illustrates a web application screen for importing EDL data. As discussed above, the user imports the EDL file corresponding to the production for which the cue sheet is required. The user is first prompted to select an EDL format for a file upload from a selection drop-down box 41. In another embodiment, the user pastes the text of an EDL file directly into a special web application window (not shown). In the second step, the user either selects an EDL to upload 42 or pastes the EDL text as discussed above.

Figure 4:
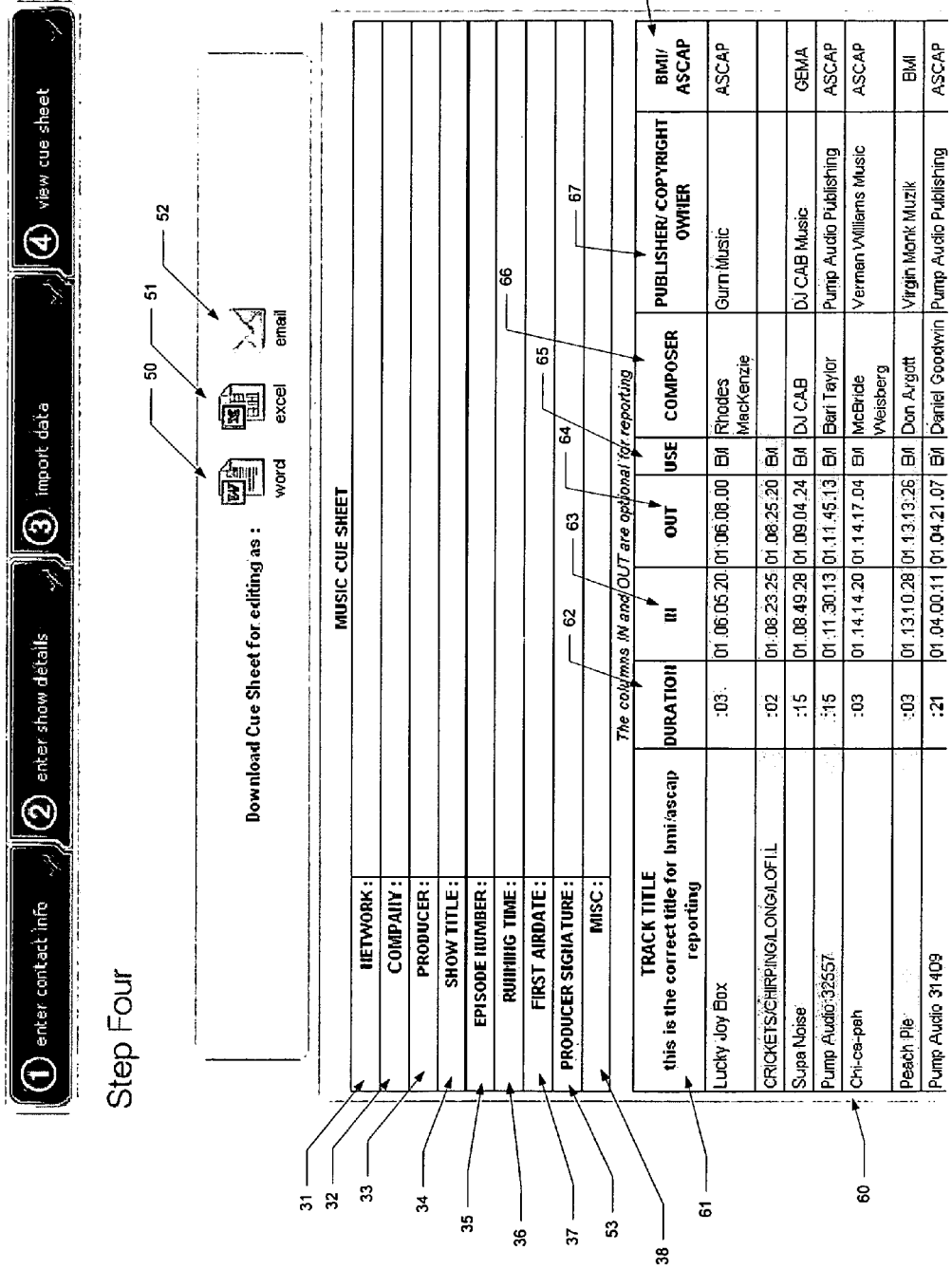
FIG. 4 illustrates the EDL presentation screen of the web application.

FIG. 4 illustrates the EDL presentation screen of the web application. As discussed above, the EDL file is imported to the application web server via the internet by the upload procedure of FIG. 3. The user selects from available formats 50, 51, 52 for the cue sheet information. In the illustrated embodiment, the formats include a Word file 50, an Excel spreadsheet 51, or an Email attachment 52. The web application parses the imported EDL file and extracts the information needed to generate a cue sheet. The cue sheet information is displayed in a cue sheet display area 60 of the web application. The first section of the cue sheet display provides the show details discussed with reference to FIG. 2. Additionally, the section includes a field for a producer signature 53. The second section of the cue sheet provides detail as to the works used in the show as extracted from the input EDL file. The detail information includes the track title 61 duration of use 62, the timecode in the program during which the music track was used 63, 64 and form of use 65. A third section of the cue sheet displays information retrieved from databases which is required for the cue sheet submission. The information is retrieved by the application searching a database which contains additional key data for cue sheet purposes: writer name 66, publisher 67, and affiliated PRS 68. In one embodiment, the database is an internal database maintained by the web application provider. In another embodiment, the database is an external public database. Preferably, the internal database is a database of works compiled from both local and external sources providing musical work information. The application dynamically formats the entire cue sheet, based on built-in templates that fulfill the required PRS formatting. As discussed above, the cue sheet data illustrated in FIG. 4 is preferably displayed to the user in HTML format. As discussed above, the user downloads a copy of the cue sheet from the web based application server to their local computer as either a Microsoft Word or Microsoft Excel document. This feature allows the user to subsequently alter the document to suit the individual user purposes. In some implementations, the user emails copies of the cue sheet in either format to other users directly through the web application without saving a local copy on the user computer by employing the e-mail option.

Although the present invention was discussed in terms of certain preferred embodiments, the invention is not limited to such embodiments. A person of ordinary skill in the art will appreciate that numerous variations and combinations of the features set forth above can be utilized without departing from the present invention as set forth in the claims. Thus, the scope of the invention should not be limited by the preceding description but should be ascertained by reference to claims that follow.

The invention claimed is:

1. A method in a computing system of generating a cue sheet for submission to a performing rights society, the method comprising:
    receiving an edit decision list containing edit actions associated with a plurality of tracks in a broadcast production;
    receiving metadata associated with the broadcast production comprising one or more of a name of the broadcast production, a network airing the broadcast production, a production company of the broadcast production, a producer, a length of the broadcast production and an airing date of the broadcast production;
    extracting at least one track identifier associated with a track from the edit decision list;
    extracting use data from the edit decision list for each extracted track identifier, the use data comprising a duration of use of the associated track and a form of use of the associated track;
    searching a music catalog database to retrieve identification data for each extracted track identifier, the identification data comprising a composer, a publisher, and a performing rights society affiliated with the extracted track identifier; and
    dynamically formatting with the computer system a cue sheet for submission to a performing rights society for the payment of royalties, the cue sheet comprising information about tracks used in the broadcast production including: 1) track titles, duration of use and a form of use that are extracted from the edit decision list 2) a composer's name, publisher and affiliated performing rights society associated with a track that are retrieved from the database and 3) at least some of the received metadata;
    wherein code implementing the method is stored in a memory of the computing system for execution by a processor of the computing system.

2. The method of claim 1, wherein the metadata comprises one or more pieces of data selected from an air date, a network, a company, or a producer.

3. The method of claim 1, wherein the track identifier is a track title.

4. The method of claim 1, wherein the duration is calculated from a start time and a stop time.

5. The method of claim 1, further comprising receiving a selection of an output format for the cue sheet.

6. The method of claim 5, wherein the output format is selected from the group comprising a Word file, an Excel spreadsheet, or an Email attachment.

7. The method of claim 1, further comprising receiving a format of the edit decision list.

8. The method of claim 7, wherein the extraction from the edit decision list depends on the received format.

9. A computer readable storage medium encoded with instructions that, when executed by a processor, cause the processor to implement a method to generate a cue sheet for submission to a performing rights society, the method comprising:
    receiving an edit decision list containing edit actions associated with a plurality of tracks in a broadcast production;
    receiving metadata associated with the broadcast production comprising one or more of a name of the broadcast production, a network airing the broadcast production, a production company of the broadcast production, a producer, a length of the broadcast production and an airing date of the broadcast production;
    extracting at least one track identifier associated with a track from the edit decision list;
    extracting use data from the edit decision list for each extracted track identifier, the use data comprising a duration of use of the associated track and a form of use of the associated track;
    searching a music catalog database to retrieve identification data for each extracted track identifier, the identification data comprising a composer, a publisher, and a performing rights society affiliated with the extracted track identifier; and
    dynamically formatting with the processor a cue sheet for submission to a performing rights society for the payment of royalties, the cue sheet comprising information about tracks used in the broadcast production including: 1) track titles, duration of use and a form of use that are extracted from the edit decision list 2) a composer's name, publisher and affiliated performing rights society affiliated with a track that are retrieved from the database and 3) at least some of the received metadata.

10. The computer readable storage medium of claim 9, wherein the metadata comprises one or more pieces of data selected from an air date, a network, a company, a producer, a show title, an episode number, or a running time.

11. The computer readable storage medium of claim 9, wherein the track identifier is a track title.

12. The computer readable storage medium of claim 9, wherein the duration is calculated from a start time and a stop time.

13. The computer readable storage medium of claim 9, the method further comprising receiving a selection of an output format for the cue sheet.

14. The computer readable storage medium of claim 13, wherein the output format is selected from the group comprising a Word file, an Excel spreadsheet, or an Email attachment.

15. The computer readable storage medium of claim 9, the method further comprising receiving a format of the edit decision list.

16. The computer readable storage medium of claim 15, wherein the extraction from the edit decision list depends on the received format.

17. A computing system for generation of a cue sheet for submission to a performing rights society, the computing system comprising:

a processor and a storage area, wherein the storage area includes:

instructions executable by the processor to provide an input component for receiving an edit decision list containing edit actions associated with a plurality of tracks in a broadcast production and receiving metadata associated with the broadcast production comprising one or more of a name of the broadcast production, a network airing the broadcast production, a production company of the broadcast production, a producer, a length of the broadcast production and an airing date of the broadcast production;

instructions executable by the processor to provide an extraction component for extracting at least one track identifier associated with a track from the edit decision list and extracting use data from the edit decision list for each extracted track identifier, the use data comprising a duration of use of the associated track and a form of use of the associated track;

instructions executable by the processor to provide a search component for searching a music catalog database to retrieve identification data for each extracted track identifier, the identification data comprising a composer, a publisher, and a performance right society affiliated with the extracted track identifier; and instructions executable by the processor to provide an output component for dynamically formatting with the processor a cue sheet for submission to a performing rights society for the payment of royalties, the cue sheet comprising information about tracks used in the broadcast production including: 1) track titles, duration of use and a form of use that are extracted from the edit decision list 2) a composer's name, publisher and affiliated performing rights society associated with a track that are retrieved from the database and 3) at least some of the received metadata.

18. The computing system of claim 17, wherein the track identifier is a track title.

19. The computing system of claim 17, wherein the duration is calculated from a start time and a stop time.

20. The computing system of claim 17, wherein the input component further receives a format of the edit decision list.

21. The computing system of claim 20, wherein the extraction by the extraction component from the edit decision list is based on the received format.

* * * * *

UNITED STATES PATENT AND TRADEMARK OFFICE
CERTIFICATE OF CORRECTION

| | | |
|---|---|---|
| PATENT NO. | : 7,925,671 B2 | Page 1 of 1 |
| APPLICATION NO. | : 11/133903 | |
| DATED | : April 12, 2011 | |
| INVENTOR(S) | : Steven Ellis et al. | |

It is certified that error appears in the above-identified patent and that said Letters Patent is hereby corrected as shown below:

On the Title Page, item (73), in Assignee, in column 1, line 1, delete "Getty Image" and insert
-- Getty Images --, therefor.

Signed and Sealed this
Fourth Day of October, 2011

David J. Kappos
*Director of the United States Patent and Trademark Office*